United States Patent
Cheng (10) Patent No.: US 8,400,086 B2
(45) Date of Patent: Mar. 19, 2013

(54) INITIAL ROTOR POSITION DETECTION FOR PERMANENT MAGNET SYNCHRONOUS MOTORS

(75) Inventor: Kuang-Yao Cheng, Taipei (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 506 days.

(21) Appl. No.: 12/689,411

(22) Filed: Jan. 19, 2010

(65) Prior Publication Data

US 2010/0181952 A1 Jul. 22, 2010

(30) Foreign Application Priority Data

Jan. 22, 2009 (TW) .............................. 98102560 A (51) Int. Cl.
*H02P 21/00* (2006.01)

(52) U.S. Cl. ......... 318/400.02; 318/400.01; 318/400.14; 318/400.32; 318/721

(58) Field of Classification Search ............. 318/400.01, 318/400.02, 400.32, 721, 801, 599, 432, 318/400.33, 400.14, 400.1, 400.34, 400.35, 318/701, 727, 811, 799, 400.04, 400.06, 318/400.11, 400.13, 400.38, 400.39, 400.4, 318/560, 434, 437
See application file for complete search history.

(56) References Cited

U.S. PATENT DOCUMENTS

| | | | | | |
|---|---|---|---|---|---|
| 5,001,405 | A | * | 3/1991 | Cassat | 318/400.33 |
| 5,903,128 | A | * | 5/1999 | Sakakibara et al. | 318/721 |
| 5,986,419 | A | * | 11/1999 | Archer et al. | 318/400.02 |
| 6,172,498 | B1 | * | 1/2001 | Schmidt et al. | 324/207.12 |
| 6,850,863 | B2 | * | 2/2005 | Benchaib et al. | 702/151 |
| 7,466,094 | B2 | * | 12/2008 | Kim | 318/400.32 |

* cited by examiner

*Primary Examiner* — Antony M Paul
(74) *Attorney, Agent, or Firm* — Muncy, Geissler, Olds & Lowe, PLLC (57) ABSTRACT

An apparatus and method for use with a PMSM detect the fall time or the rise time and the fall time of a motor current in the PMSM under different voltage vectors when the PMSM is in start-up to determine an initial rotor position for the PMSM at standstill.

22 Claims, 11 Drawing Sheets

INITIAL ROTOR POSITION DETECTION FOR PERMANENT MAGNET SYNCHRONOUS MOTORS

FIELD OF THE INVENTION

The present invention is related generally to permanent magnet synchronous motors and, more particularly, to initial rotor position detection for permanent magnet synchronous motors.

BACKGROUND OF THE INVENTION

References of related arts are listed in the following:
[1] P. P. Acarnley and J. F. Watson, "Review of position-sensorless operation of brushless permanent-magnet machines," IEEE Trans. Ind. Electron., vol. 53, no. 2, pp. 352-362, April 2006;
[2] S. Nakashima, Y. Inagaki, and I. Miki, "Sensorless initial rotor position estimation of surface permanent-magnet synchronous motor," IEEE Trans. Ind. Applicat., vol. 36, no. 6, pp. 1598-1603, November/December 2000;
[3] W. J. Lee and S. Ki Sul, "A new starting method of BLDC Motors without position sensor," IEEE Trans. Ind. Applicat., vol. 42, no. 6, pp. 1532-1538, November/December 2006;
[4] Y. C. Chang and Y. Y. Tzou, "A new sensorless starting method for brushless DC motors without reversing rotation," IEEE PESC Conf., pp. 619-624, June 2007;
[5] U.S. Pat. No. 7,334,854 to Chang et al.;
[6] U.S. Pat. No. 6,172,498 to Schmidt et al.;
[7] U.S. Pat. No. 5,028,852 to Dunfield;
[8] U.S. Pat. No. 5,569,990 to Dunfield;
[9] U.S. Pat. No. 6,229,274 to Verremara et al.; and
[10] Y. S. Lai, F. S. Shyu, and S. S. Tseng, "New initial position detection technique for three-phase brushless DC motor without position and current sensors," IEEE Trans. Ind. Applicat., vol. 39, no. 2, pp. 485-491, March/April 2003.

Figure 1:
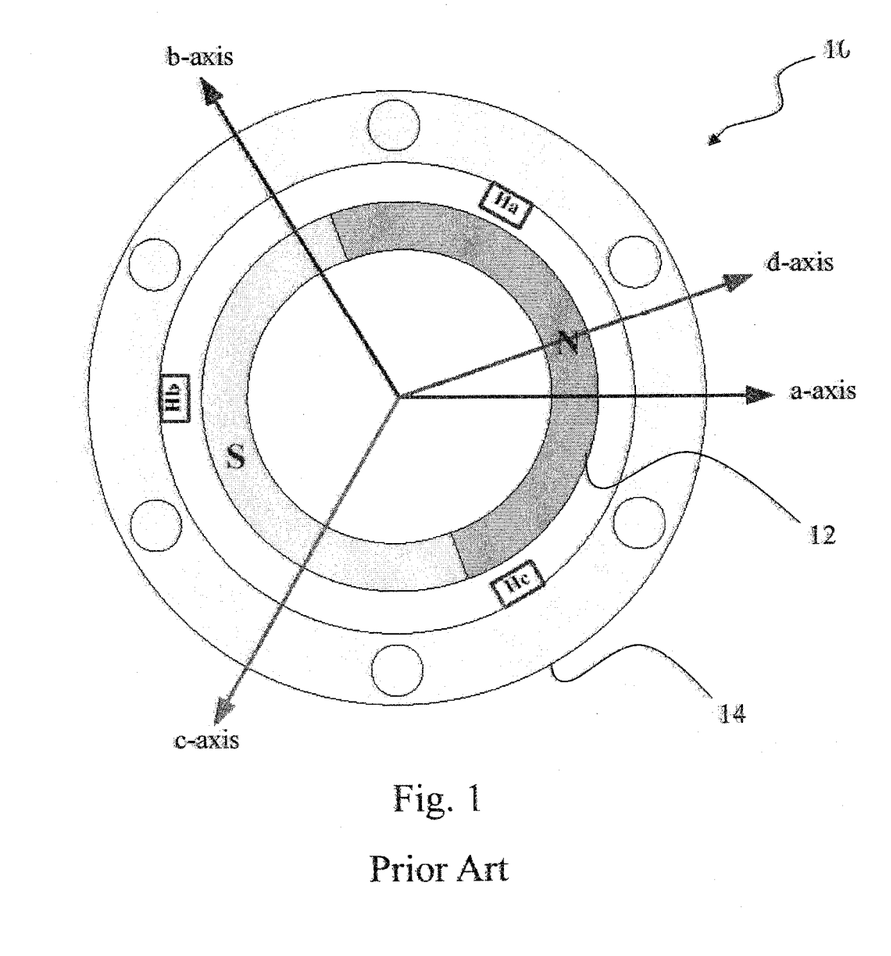
FIG. 1 is a diagram showing a conventional two-pole PMSM.

As shown in FIG. 1, a conventional two-pole permanent magnet synchronous motor (PMSM) 10 includes a rotor 12 and a stator 14. Since a PMSM is constructed with stator windings and a fixed rotor field supplied by a permanent magnet, absolute rotor position information is required to exactly control the motor torque. Resolvers, encoders, and Hall sensors are usually utilized for sensing the rotor position. However, these sensors increase the machine size and cost of the motor drive, and reduce the system reliability. Therefore, many researches have been presented to achieve position and speed sensorless control for PMSMs, for example in [1]. However, most of these researches suffer the same difficulty in detecting the rotor position at standstill. If the initial rotor position at standstill cannot be exactly detected, the starting torque of the motor decreases, and temporarily reversed rotation may occur at starting, which is not allowed in some applications, such as hard disks.

Figure 2:
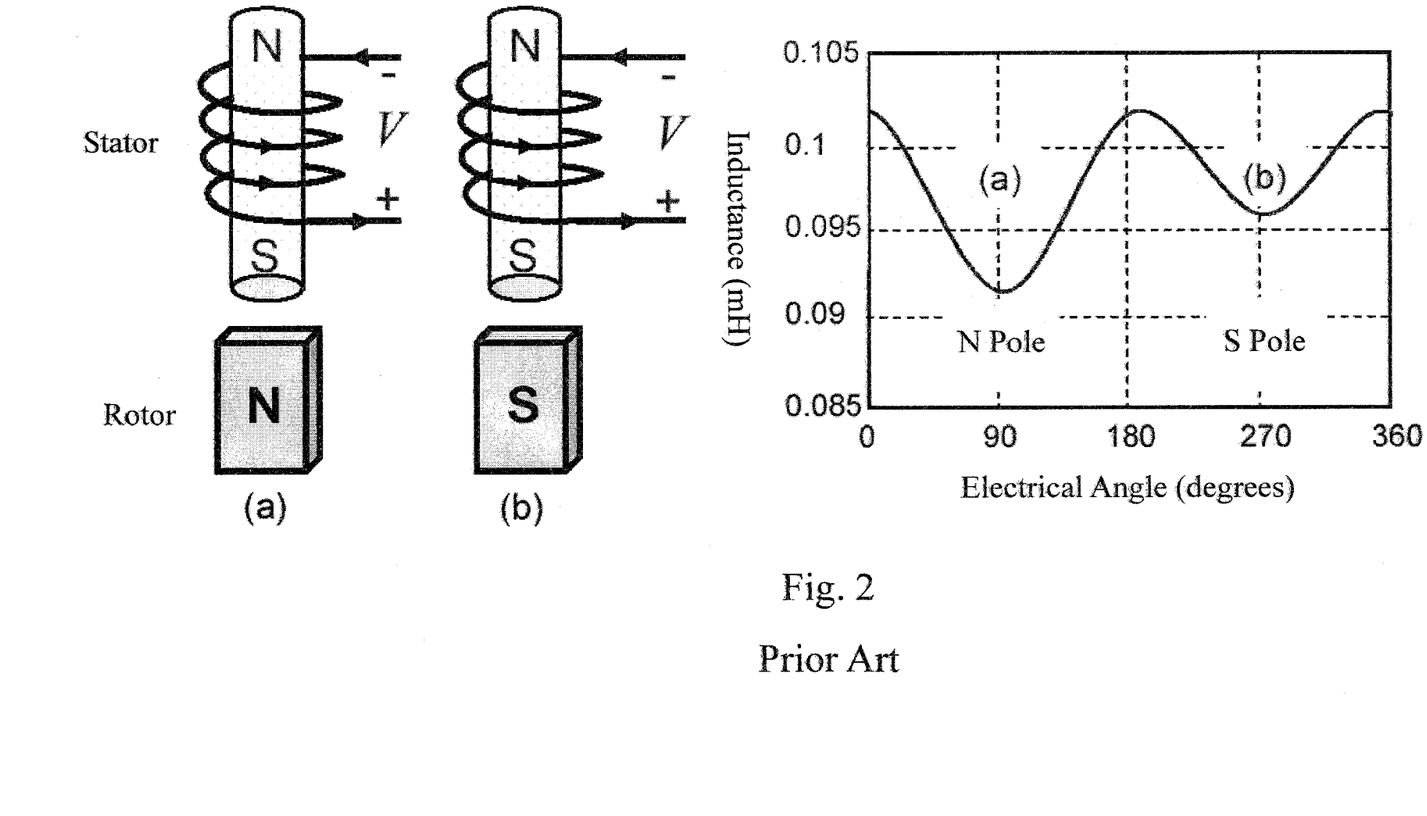
FIG. 2 is a diagram illustrating the principle of initial angle detection.
Figure 3:
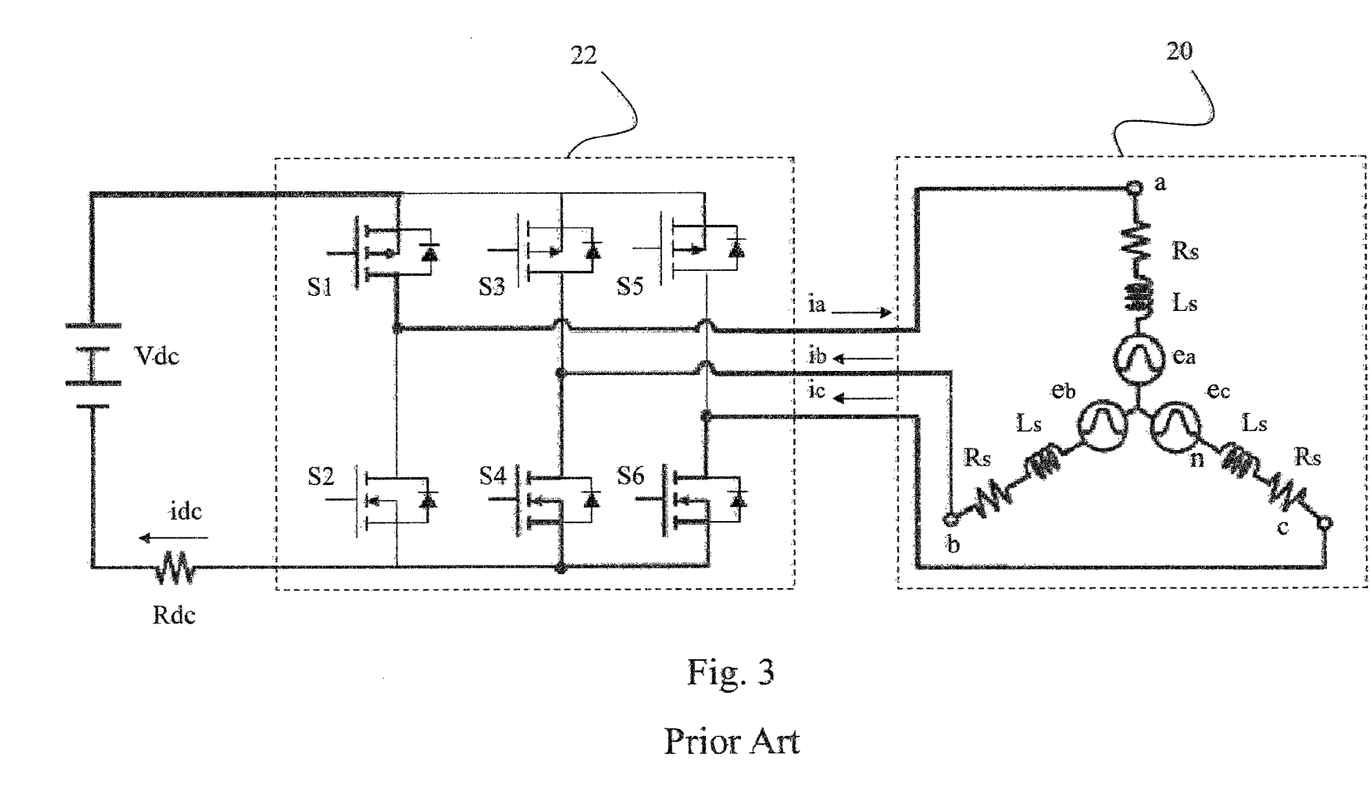
FIG. 3 is a diagram showing a PMSM driven by a PWM inverter conventionally.
Figure 4:
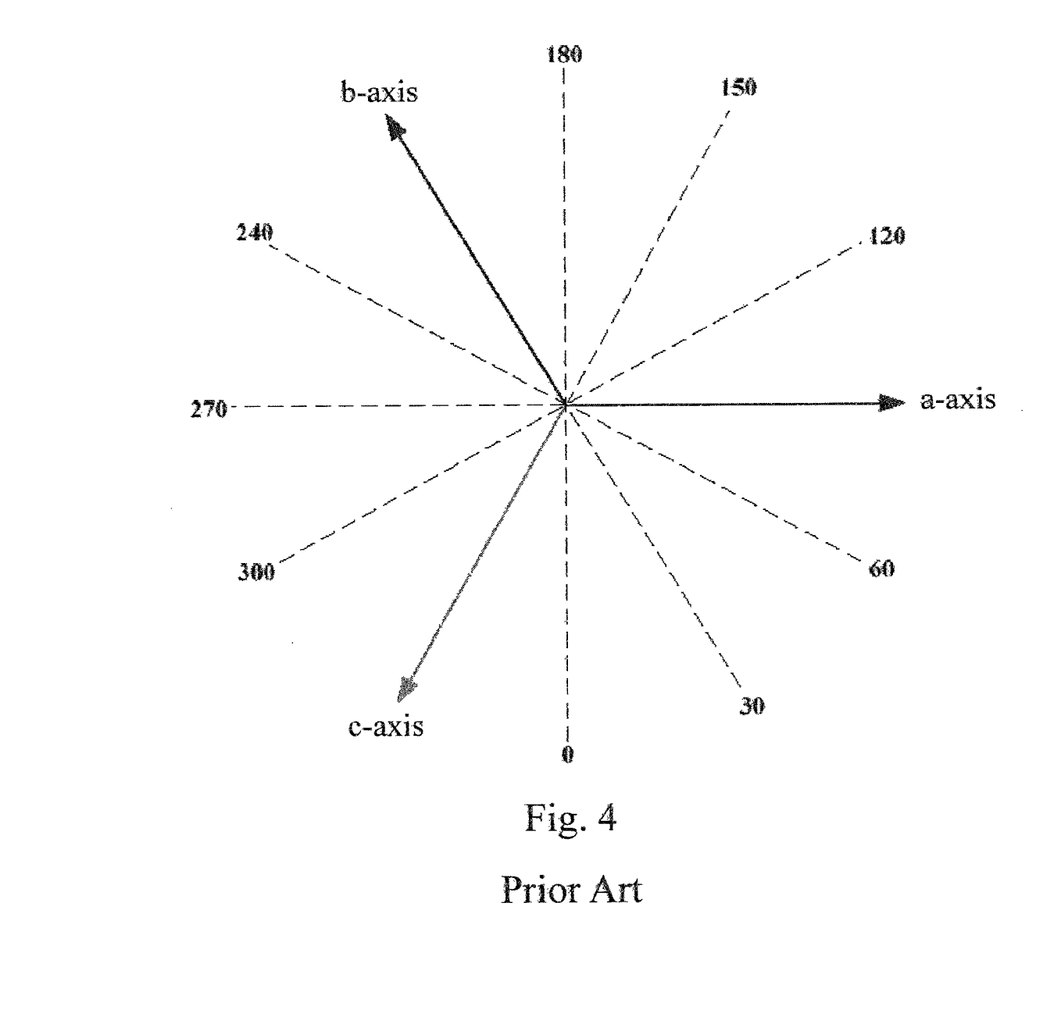
FIG. 4 is a diagram showing twelve voltage vectors provided by a PWM inverter.

Several methods for detecting the initial rotor position without alignment have been proposed [2]-[10]. The principle of initial angle detection is illustrated in FIG. 2. The stator inductance is a function of rotor flux and stator current, and the stator current will slightly increase or decrease the stator saturation according to the direction of the induced field. The stator inductance is indirectly detected by detecting the stator current under a voltage V. FIG. 3 is a diagram showing a PMSM 20 driven by a pulse width modulation (PWM) inverter 22 conventionally. The PWM inverter 22 includes six power switches S1-S6, and by switching the six power switches S1-S6, different voltage vectors, such as twelve voltage vectors with thirty-degree resolution shown in FIG. 4, are provided for the PMSM 20. A shunt resistor Rdc is coupled with the PWM inverter 22, and a DC-link current idc flowing therethrough is a function of the motor current flowing through the motor 20. Those methods for initial rotor position detection at standstill can be classified into three types, namely peak current measurement [2]-[6], rise time measurement [7]-[9], and terminal voltage detection [10].

Figure 5:
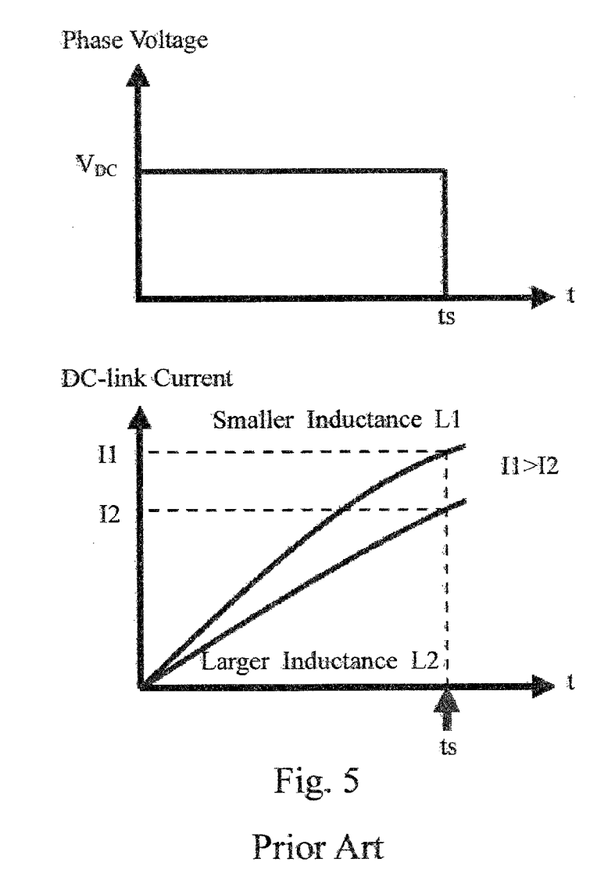
FIG. 5 is a diagram showing the DC-link current response with different inductances.

The estimation methods based on the inductance variation due to the magnetic saturation effect have been presented by measuring the peak currents in [2]-[5]. FIG. 5 is a diagram showing the DC-link current response with different inductances. Referring to FIGS. 3 and 5, different voltage vectors are applied to the PMSM 20 with a preset voltage vector conduction time duration ts and the peak values of the phase or DC-link current idc are used to indicate the initial rotor position. The rise time of the current idc reflects the time constant of the windings, which is smaller for smaller inductance. In order to get the maximum peak-current difference, the optimal time duration ts of the applied voltage vector should be around the average time constant of the stator winding [3]. The lower the equivalent inductance of the PMSM 20 is, the greater the peak value of the DC-link current idc will be at the end of the time duration ts. Since the inductance in the windings is a function of rotor flux, the rotor position reflects the difference of time constant. Therefore, the relative position between the rotor magnet and the stator winding can be determined by the peak current response resulting from different voltage vectors. However, this duration may cause the rotor slightly rotate and may also cause over-current conditions. Besides, a high-resolution analog-to-digital converter (ADC) is required for evaluating the peak-current difference to achieve accurate initial angle detection. Different approaches for detecting the inductance variation without directly sensing the peak current have been presented in [6]-[10]. In [6], a method for measuring the rate of current change with respect to time for each current to determine rotor position angles at standstill is presented. However, an ADC is still required with this method, and the determination of current change rate may have large variations due to the noise issue.

The initial rotor position detection based on rise time measurement also determines the initial rotor position according to inductance variation, except that the peak current is not measured directly. Instead of measuring the peak value or the change rate of the currents, the sign of the time difference between the rise times of the currents is detected for determining rotor position angles [7]. Only a comparator is required to compare the current with a preset threshold value to control the pulse widths of the induced voltages. However, if the rotor is perpendicular to one of the testing voltage vectors, the sign of the time difference may be ambiguous. Besides, only two phases will be conducted at the same time with the six testing vectors. In order to solve the ambiguity issue of [7], a method with combined the sign of the rise time difference or its magnitude of the rise time is presented along with look-up tables to determine the rotor position, and all three phases will be conducted by tying the third phase to high or low to further resolve the ambiguity for rotor position detection with the method [8]. Instead of using the time difference of the rise times of the currents conducted by two opposite voltage vectors, the shortest time period of the rise times of all tested currents is used to indicate the rotor position in [9]. It should be noted that the presented methods in [6]-[9] all utilize the rise times of the conducted currents to determine the rotor position angle. The methods for initial rotor position detection via rise time measurement base their accuracy on timers used for counting rise time, and are therefore more accurate than those methods relying on measurement by ADCs. Moreover, according to such methods, rise time difference is related only to inductance variation and is irrelevant to inductance values.

The initial rotor position detection via terminal voltage detection determines angular rotor position according to a current free-wheeling period. Although neither current sensors nor ADCs are required with the method presented in [10], three comparators are necessary for comparing the scaled terminal voltage levels, such as the voltage levels at the terminals a, b, and c shown in FIG. 3. The accuracy of the rotor position detection may be reduced with scaling the terminal voltages due to the noise issue. Besides, only sixty-degree resolution can be obtained with this method.

In order to avoid mistakes when applying the methods for initial rotor position detection based on rise time measurement, it is necessary to wait until the motor current drops to zero before switching to a next voltage vector. Since the back-EMF voltage of the motor is zero at stand still, the DC-link current under a voltage vector applied to a motor can be derived as $$idc = \frac{Vdc}{Req}\left[1 - e^{-\frac{Req}{L}t}\right], \qquad [\text{Eq-1}]$$

where Vdc is the DC-link voltage, Req is the equivalent resistance corresponding to the applied voltage vectors, and L is the equivalent stator inductance. If the voltage drop of the free-wheeling diode is neglected, by setting a threshold current Ith for limiting the DC-link current idc, it can be derived the rise time of the DC-link current idc from zero to Ith as $$tr = -\frac{L}{Req}\ln\left(1 - \frac{Req \times Ith}{Vdc}\right), \qquad [\text{Eq-2}]$$

and the fall time of the DC-link current idc from Ith to zero as $$tf = -\frac{L}{Req}\ln\left(\frac{-\frac{Vdc}{Req}}{Ith - \frac{Vdc}{Req}}\right). \qquad [\text{Eq-3}]$$

From the equations Eq-2 and Eq-3, the rise time tr and the fall time tf are both proportional to the stator inductance L which varies with the rotor position angle due to the magnetic saturation effect. However, all the current methods for initial rotor position detection based on rise time measurement use single-ended amplifier circuits to detect the motor current, so that only the rise time, but not the fall time, of the motor current can be detected, and in consequence the time that the motor current drops to zero cannot be precisely determined. According to the equation Eq-3, the time that the motor current drops to zero may vary with different voltage vectors. Therefore, it is necessary to set a long delay time after the motor current rises to the threshold value so as to ensure that the motor current will be zero when switching between different voltage vectors. As a result, a long detection time is needed at motor startup.

Therefore, it is desired an apparatus and method for initial rotor position detection with a shorter detection time.

SUMMARY OF THE INVENTION

An object of the present invention is to provide an apparatus and a method for initial rotor position detection for PMSMs.

Another object of the present invention is to provide an apparatus and a method for detecting the fall time of a motor current in initial rotor position detection.

According to the present invention, an apparatus for initial rotor position detection for a permanent magnet synchronous motor includes a current sensor to sense a motor current to thereby generate a sensing signal, an internal digital initial angle detector to sequentially apply different voltage vectors to the permanent magnet synchronous motor, and an internal analog current processing circuit to detect the sensing signal to thereby generate an over-current signal and a zero-current signal for the internal digital initial angle detector. The internal digital initial angle detector counts the rise time and fall time of the motor current under each of the voltage vectors according to the over-current signal and the zero-current signal, and determines an initial rotor position for the permanent magnet synchronous motor according to the rise time and fall time.

According to the present invention, a method for initial rotor position detection for a permanent magnet synchronous motor includes sequentially applying different voltage vectors to the permanent magnet synchronous motor, detecting a rise time and a fall time of a motor current under each of the voltage vectors, and determining an initial rotor position for the permanent magnet synchronous motor according to the voltage vector corresponding to the shortest total of the rise time and fall time.

According to the present invention, an apparatus for initial rotor position detection for a permanent magnet synchronous motor includes a current sensor to sense a motor current to thereby generate a sensing signal, an internal digital initial angle detector to sequentially apply different voltage vectors to the permanent magnet synchronous motor, and an internal analog current processing circuit to detect the sensing signal to thereby generate an over-current signal and a zero-current signal for the internal digital initial angle detector. The internal digital initial angle detector counts the fall time of the motor current under each of the voltage vectors according to the over-current signal and the zero-current signal, and determines an initial rotor position for the permanent magnet synchronous motor according to the fall time.

According to the present invention, a method for initial rotor position detection for a permanent magnet synchronous motor includes sequentially applying different voltage vectors to the permanent magnet synchronous motor, detecting a fall time of a motor current under each of the voltage vectors, and determining an initial rotor position for the permanent magnet synchronous motor according to the voltage vector corresponding to the shortest fall time.

In the proposed apparatus and method, no ADCs are required to measure the motor currents. Besides, not only the rise times but also the fall times of the motor currents will be utilized for determining the initial rotor position angle at standstill. Therefore, higher sensitivity to noise issue can be obtained with compared to related arts. Furthermore, with generating twelve voltage vectors, thirty-degree resolution for the initial angle detection can be achieved for smoother startup performance. Another important feature of the present invention is that since the instant of the motor current free-wheeling to zero can be obtained with the fall-time detection, the next testing voltage vector can be applied just after the motor current drops to zero. Hence the fast detecting process can be achieved.

BRIEF DESCRIPTION OF THE DRAWINGS

These and other objects, features and advantages of the present invention will become apparent to those skilled in the art upon consideration of the following description of the preferred embodiments according to the present invention taken in conjunction with the accompanying drawings, in which.

DETAIL DESCRIPTION OF THE INVENTION

Figure 6:
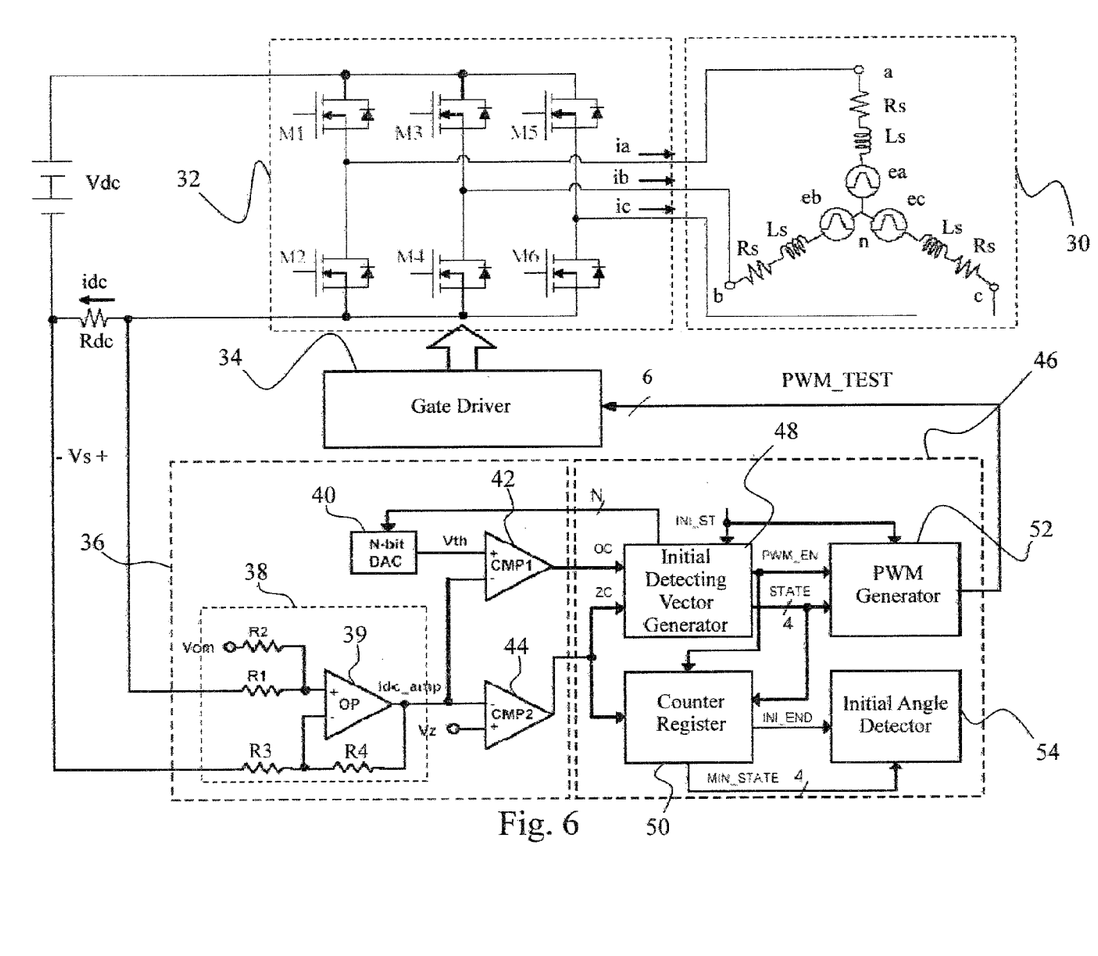
FIG. 6 is a circuit diagram of a first embodiment according to the present invention.

FIG. 6 is a circuit diagram of a first embodiment according to the present invention, in which a gate driver 34 switches power switches M1-M6 in a PWM inverter 32 according to a signal PWM_TEST provided by an internal digital initial angle detector 46 so as to apply different voltage vectors to a PMSM 30, a shunt resistor Rdc is coupled to the PMSM 30 for establishing a DC-link current idc related to a motor current of the PMSM 30 to be detected to generate a sensing signal Vs, an internal analog current processing circuit 36 generates an over-current signal OC and a zero-current signal ZC according to the sensing signal Vs, and the internal digital initial angle detector 46 generates the signal PWM_TEST according to the over-current signal OC and the zero-current signal ZC.

Figure 7:
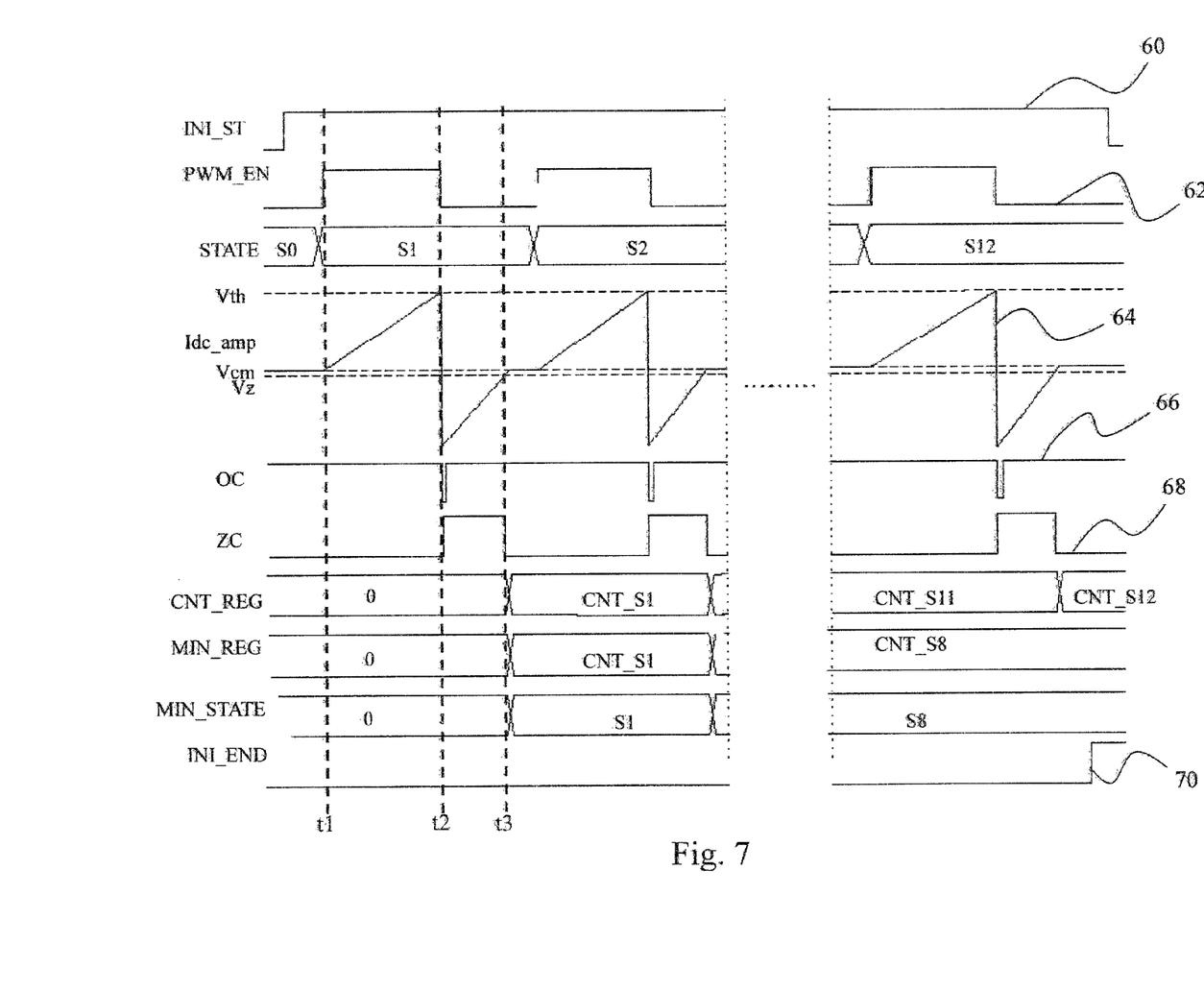
FIG. 7 is a waveform diagram of the circuit shown in FIG. 6.

FIG. 7 is a waveform diagram of the circuit shown in FIG. 6. When the PMSM 30 is started from standstill, a starting signal INI_ST, as shown by the waveform 60, is provided to enable an initial detecting vector generator 48 and a pulse width modulation (PWM) generator 52 in the internal digital initial angle detector 46, and following that, the initial detecting vector generator 48 provides a high-level enabling signal PWM_EN and a state signal STATE corresponding to a voltage vector S1 for the PWM generator 52, as shown by the waveform 62 at time t1. The PWM generator 52 generates the signal PWM_TEST for the gate driver 34 according to the enabling signal PWM_EN and state signal STATE, to switch the power switches M1-M6, and generate the voltage vector S1 applied to the PMSM 30.

Responsive to the voltage vector S1 applied to the PMSM 30, the motor current in the PMSM 30 begins to rise, and the DC-link current idc begins to rise accordingly. A double-ended amplifier circuit 38 in the internal analog current processing circuit 36 amplifies the sensing signal Vs detected from the shunt resistor Rdc and adds an offset voltage Vcm to the sensing signal Vs so as to generate an amplified signal Idc_amp, as shown by the waveform 64. The double-ended amplifier circuit 38 includes an operational amplifier 39 and resistors R1-R4. The operational amplifier 39 has a non-inverting input connected to one end of the shunt resistor Rdc through the resistor R1, and to a voltage source through the resistor R2 for the offset voltage Vcm, and an inverting input connected to the other end of the shunt resistor Rdc through the resistor R3, and to an output of the operational amplifier 39 through the resistor R4. The internal analog current processing circuit 36 further includes comparators 42 and 44, to compare a voltage Vth provided by a digital-to-analog converter (DAC) 40 with the amplified signal Idc_amp so as to generate the over-current signal OC, as shown by the waveform 66, and to compare the amplified signal Idc_amp with a voltage Vz so as to generate the zero-current signal ZC, as shown by the waveform 68. The voltages Vth and Vz represent a threshold current Ith and a zero current, respectively.

When the amplified signal Idc_amp becomes greater than the voltage Vth, the over-current signal OC transits to low, as shown at time t2, so that the enabling signal PWM_EN transits to low. At this time, the PWM generator 52 turns off the signal PWM_TEST, and in consequence the PWM inverter 32 enters a free-wheeling state, that is, a state at which all the power switches M1-M6 are turned off. Meanwhile, the motor current in the PMSM 30 begins to fall, and the sensing signal Vs will become negative. Consequently, the amplified signal Idc_amp becomes negative and the zero-current signal ZC transits to high. Thereafter, when the amplified signal Idc_amp becomes greater than zero, as shown at time t3, the zero-current signal ZC transits to low, meaning that the motor current in the PMSM 30 has dropped to zero. As soon as the zero-current signal ZC transits from high to low, the initial detecting vector generator 48 sends out another high-level enabling signal PWM_EN and a state signal STATE corresponding to a voltage vector S2 to the PWM generator 52, thus applying the voltage vector S2 to the PMSM 30.

Figure 8:
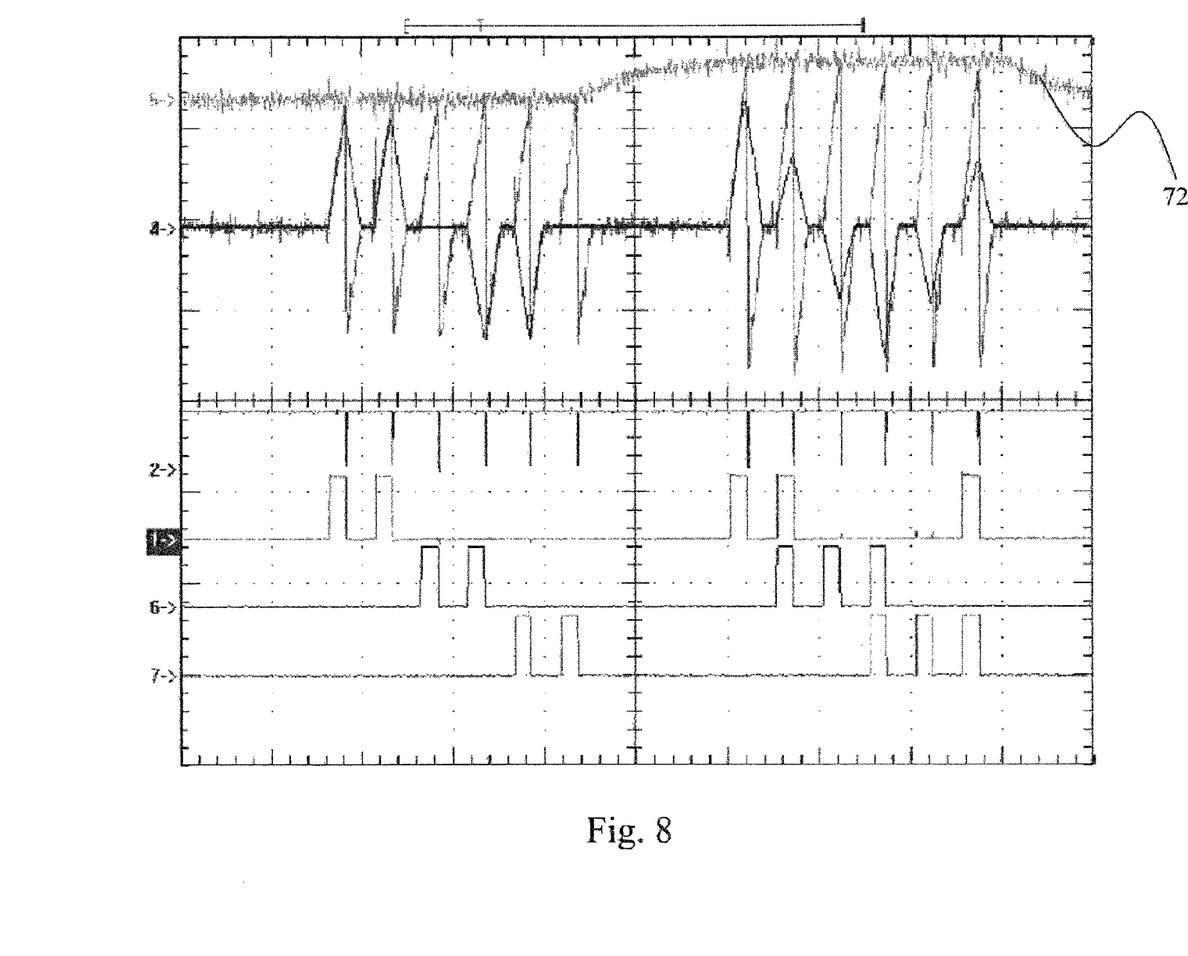
FIG. 8 is a waveform diagram of a threshold voltage for a DAC.

A counter register 50 counts the rise time and fall time of the DC-link current idc according to the enabling signal PWM_EN and the zero-current signal ZC, respectively, so as to obtain a total conduction time CNT_S1 of the motor current in the PMSM 30 under the voltage vector S1. The counter register 50 stores the total conduction time CNT_S1 and the corresponding voltage vector S1. Similarly, after the voltage vector S2 is applied to the PMSM 30, the count resister 50 uses the over-current signal OC and the zero-current signal ZC to extract a total conduction time CNT_S2 of the motor current in the PMSM 30 under the voltage vector S2. Then, the total conduction time CNT_S2 is compared with the total conduction time CNT_S1 stored in the counter register 50. If the total conduction time CNT_S2 is shorter than the total conduction time CNT_S1, the voltage vector S2 and the total conduction time CNT_S2 are stored in place of the voltage vector S1 and the total conduction time CNT_S1; otherwise, the voltage vector S1 and the total conduction time CNT_S1 are remained. After tests with all the voltage vectors S1-S12 are completed, the counter register 50 sends out a signal MIN_STATE to inform an initial angle detector 54 of the voltage vector with the shortest total conduction time, say the voltage vector S8 for example. The counter register 50 also sends out a signal INI_END to inform the initial angle detector 54 that testing has ended. Thus, the initial angle detector 54 determines an initial rotor position for the PMSM 30 according to the voltage vector S8 with the shortest total conduction time. In other embodiments, the counter register 50 is configured to store all the voltage vectors and their corresponding total conduction times, identify the voltage vector with the shortest total conduction time, and then inform the initial angle detector 54 of the identified voltage vector. FIG. 8 is a waveform diagram of the voltage Vth. Since different voltage vectors may result in different equivalent inductances of the PMSM 30, and it is known from the equations Eq-2 and Eq-3 that the equivalent inductance of the PMSM 30 will affect the total conduction time, the initial detecting vector generator 48 provides a signal to the DAC 40 according to the voltage vector applied to the PMSM 30 so as to adjust the voltage Vth, as shown by the waveform 72, thus allowing the total conduction times of all the voltage vectors to be compared on a same basis.

Figure 9:
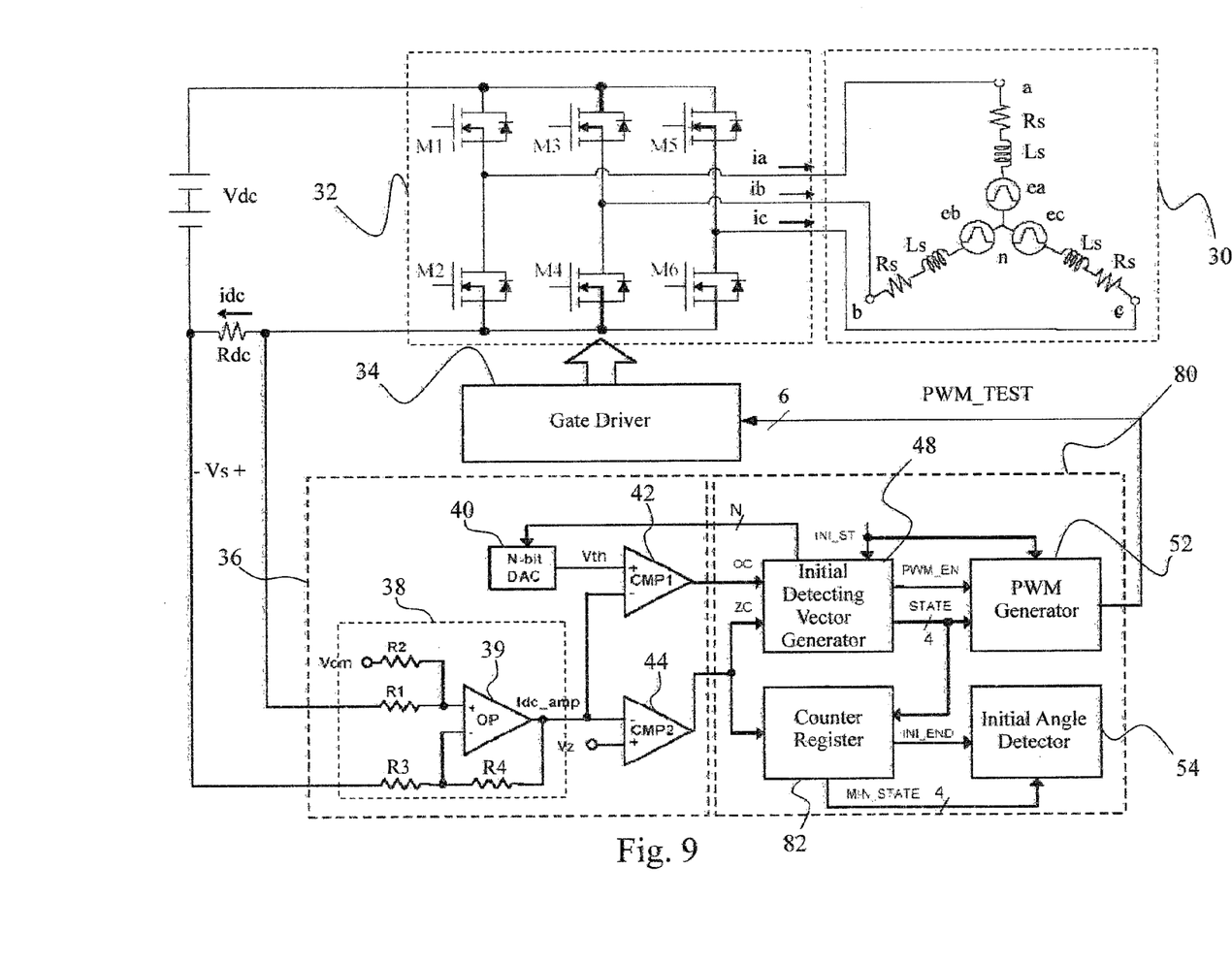
FIG. 9 is a circuit diagram of a second embodiment according to the present invention.

FIG. 9 is a circuit diagram of a second embodiment according to the present invention. In addition to the PMSM 30, the inverter 32, the gate driver 34, the shunt resistor Rdc, and the internal analog current processing circuit 36 the same as those of FIG. 6, an internal digital initial angle detector 80 has the initial detecting vector generator 48 to provide the signal PWM_EN and the state signal STATE according to the over-current signal OC and the zero-current signal ZC. The PWM generator 52 in the internal digital initial angle detector 80 generates the signal PWM_TEST according to the signals PWM_EN and STATE to switch the voltage vector applied to the PMSM 30. A counter register 82 in the internal digital initial angle detector 80 detects the zero-current signal ZC to count the fall time of the motor current in the PMSM 30 under each of the voltage vectors. After obtaining the fall time corresponding to the presently applied voltage vector, the fall time is compared with another fall time already stored in the counter register 82. If the fall time corresponding to the presently applied voltage vector is shorter than the fall time already stored in the counter register 82, the presently fall time and its corresponding voltage vector replace the fall time and the corresponding voltage vector that are already stored in the counter register 82; otherwise, the fall time and the corresponding voltage vector that are stored in the counter register 82 are remained. Upon completion of tests with all the voltage vectors, the counter register 82 sends out the signal MIN_STATE to inform the initial angle detector 54 of the voltage vector with the shortest fall time. At the same time, the counter register 82 also sends out the signal INI_END to inform the initial angle detector 54 that testing has ended. Finally, the initial angle detector 54 determines an initial rotor position for the PMSM 30 according to the voltage vector with the shortest fall time. In other embodiments, the counter register 82 stores all the voltage vectors and their corresponding fall times and identifies the voltage vector with the shortest fall time.

Figure 10:
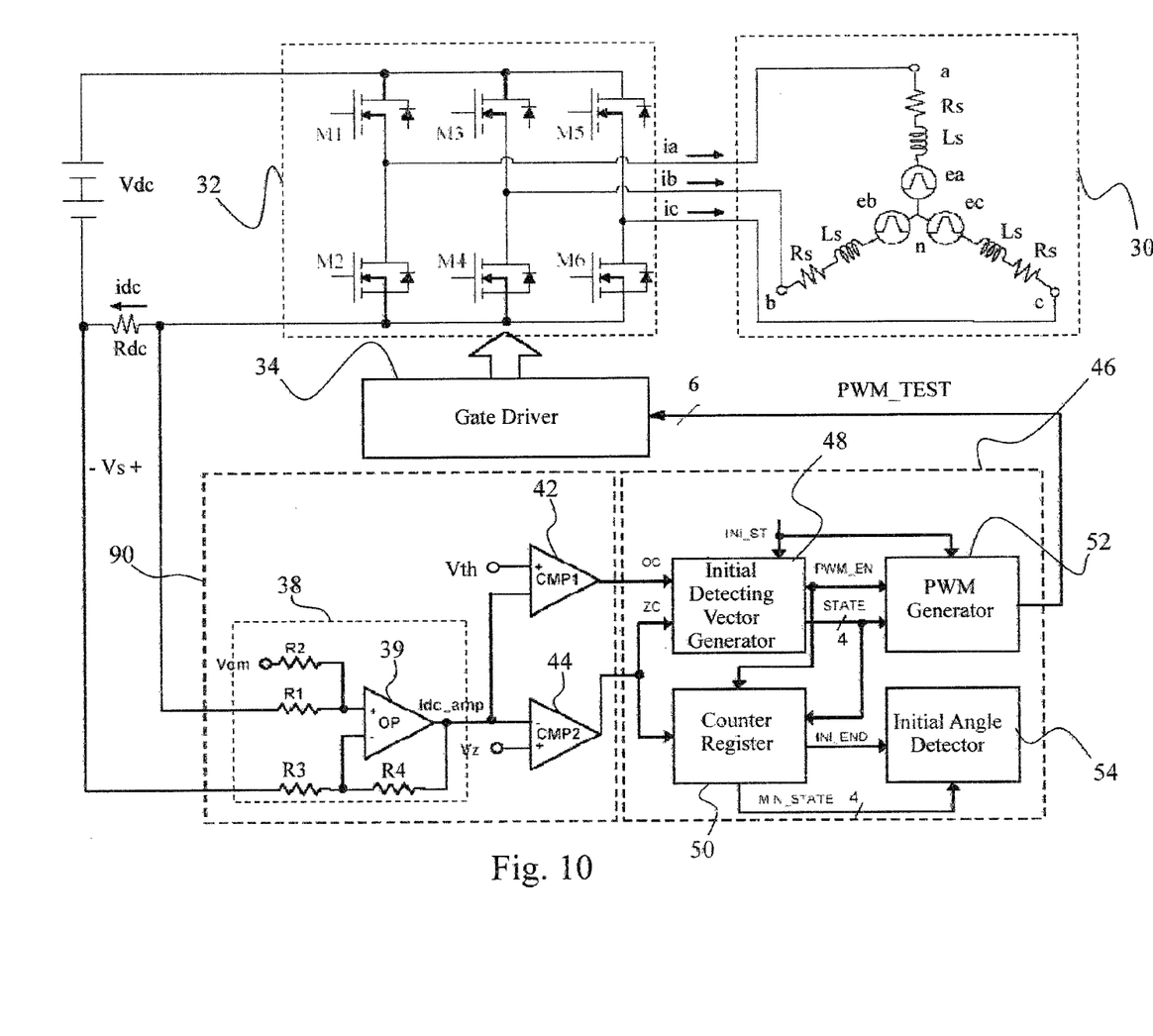
FIG. 10 is a circuit diagram of a third embodiment according to the present invention.

FIG. 10 is a circuit diagram of a third embodiment according to the present invention. In addition to the PMSM 30, the inverter 32, the gate driver 34, the shunt resistor Rdc, and the internal digital initial angle detector 46 the same as those of FIG. 6, an internal analog current processing circuit 90 includes the double-ended amplifier circuit 38 for amplifying the sensing signal Vs detected from the shunt resistor Rdc and adding the offset voltage Vcm to the sensing signal Vs so as to generate the amplified signal Idc_amp, the comparator 42 for comparing the voltage Vth with the amplified signal Idc_amp so as to generate the over-current signal OC, and the comparator 44 for comparing the amplified signal Idc_amp with the voltage Vz so as to generate the zero-current signal ZC. In this case, the voltage Vth is a constant. Similar to the first embodiment, the internal digital initial angle detector 46 in this embodiment includes the initial detecting vector generator 48, the counter register 50, the PWM generator 52, and the initial angle detector 54. Now that the voltage Vth is a constant, in order for the total conduction times corresponding to all the voltage vectors to be compared on a same basis, a digital algorithm is employed to modify the total conduction times counted by the counter register 50.

Figure 11:
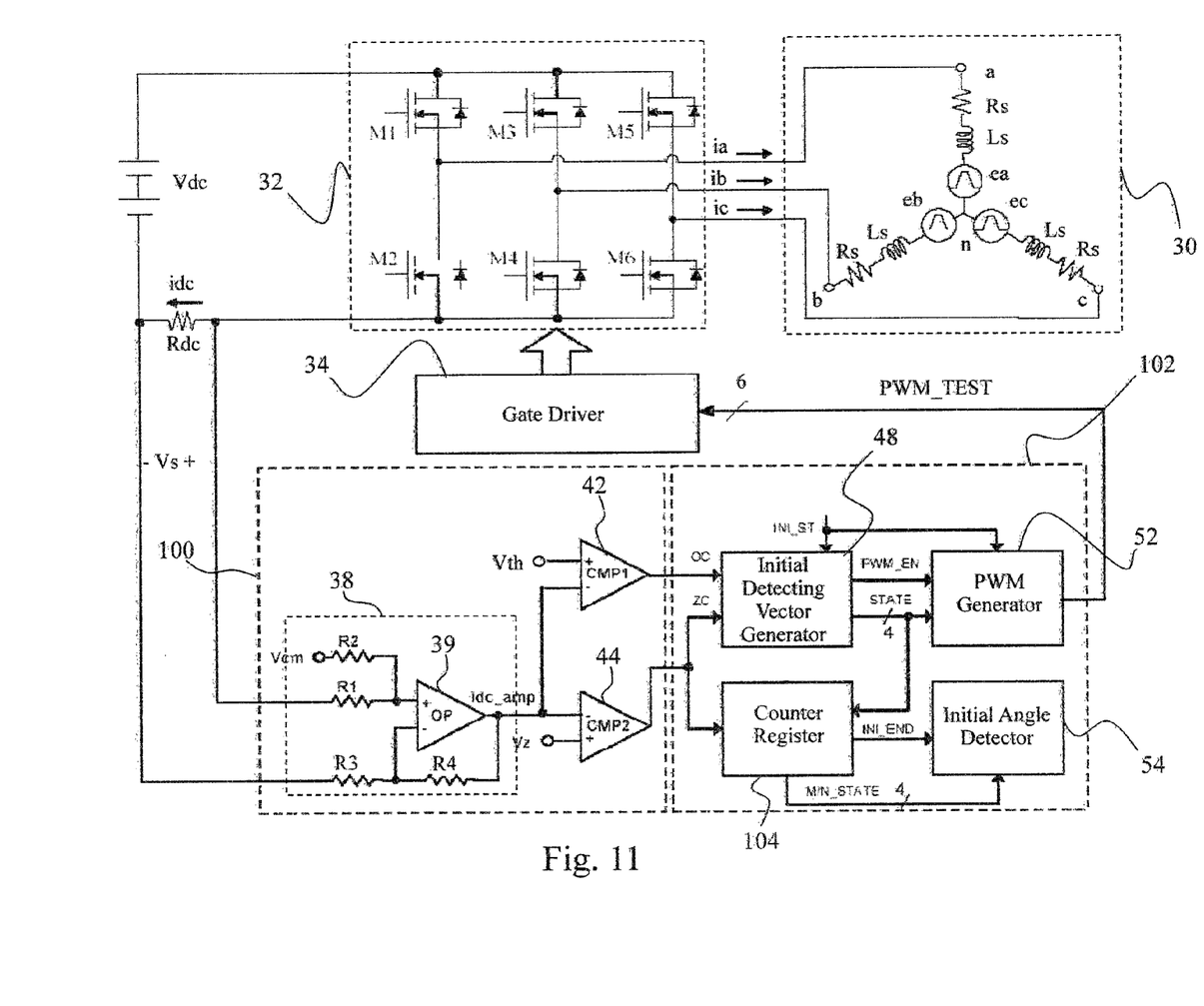
FIG. 11 is a circuit diagram of a fourth embodiment according to the present invention.

FIG. 11 is a circuit diagram of a fourth embodiment according to the present invention. In addition to the PMSM 30, the inverter 32, the gate driver 34, and the shunt resistor Rdc the same as those of FIG. 6, this embodiment includes an internal analog current processing circuit 100 and an internal digital initial angle detector 102. The internal analog current processing circuit 100 includes the double-ended amplifier circuit 38 for amplifying the sensing signal Vs detected from the shunt resistor Rdc and adding the offset voltage Vcm to the sensing signal Vs so as to generate the amplified signal Idc_amp, the comparator 42 for comparing the voltage Vth with the amplified signal Idc_amp so as to generate the over-current signal OC, and the comparator 44 for comparing the amplified signal Idc_amp with the voltage Vz so as to generate the zero-current signal ZC. The voltage Vth is a constant in this embodiment. The initial detecting vector generator 48 in the internal digital initial angle detector 102 provides the signal PWM_EN and the state signal STATE according to the over-current signal OC and the zero-current signal ZC. The PWM generator 52 in the internal digital initial angle detector 102 generates the signal PWM_TEST according to the signals PWM_EN and STATE to switch the voltage vectors applied to the PMSM 30. A counter register 104 in the internal digital initial angle detector 102 detects the zero-current signal ZC to count the fall time of the motor current in the PMSM 30 under of each of the voltage vectors. Now that the voltage Vth is a constant, in order for the fall times corresponding to all the voltage vectors to be compared on a same basis, a digital algorithm is employed to modify the fall times counted by the counter register 104. After obtaining the fall time corresponding to the presently applied voltage vector, the fall time is compared with another fall time already stored in the counter register 104. If the fall time corresponding to the presently applied voltage vector is shorter than the fall time already stored in the counter register 104, the presently obtained fall time and its corresponding voltage vector replace the fall time and the corresponding voltage vector that are already stored in the counter register 104; otherwise, the fall time and the corresponding voltage vector that are stored in the counter register 104 are remained. The counter register 104 may also store all the voltage vectors and their corresponding fall times and then identify the voltage vector with the shortest fall time.

As illustrated by the above embodiments, no ADCs are required for motor current measurement. Besides, not only is the rise time of the motor current in the PMSM 30 detected, but also the fall time of the motor current is detected, so that the initial rotor position of the PMSM 30 at standstill can be determined according to the fall time or according to the summation of the rise time and fall time. In consequence, a high sensitivity to noise and a low sensitivity to the equivalent inductance of a PMSM are achieved. Furthermore, twelve voltage vectors are provided and thus thirty-degree resolution is achieved in the initial angle detection, which leads to smooth motor startup. Moreover, as the proposed apparatus and method are capable of detecting the fall time of the motor current in the PMSM 30, it is possible to switch to a next voltage vector and apply it to the PMSM 30 as soon as the motor current in the PMSM 30 drops to zero, thereby reducing the detection time.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An apparatus for use with a permanent magnet synchronous motor, comprising:
    a current sensor coupled to the permanent magnet synchronous motor, sensing a motor current thereof to generate a sensing signal;
    an internal analog current processing circuit coupled with the current sensor, generating an over-current signal and a zero-current signal according to the sensing signal; and
    an internal digital initial angle detector coupled to the internal analog current processing circuit, sequentially applying a plurality of voltage vectors to the permanent magnet synchronous motor, and according to the over-current signal and the zero-current signal, counting a total conduction time of the motor current corresponding to each of the plurality of voltage vectors, so as to determine an initial rotor position for the permanent magnet synchronous motor.

2. The apparatus of claim 1, wherein the current sensor comprises a shunt resistor.

3. The apparatus of claim 1, wherein the internal digital initial angle detector comprises:
    an initial detecting vector generator coupled with the internal analog current processing circuit, providing an enabling signal and a state signal according to the over-current signal and the zero-current signal;
    a pulse width modulation generator coupled with the initial detecting vector generator, selecting one from the plurality of voltage vectors according to the enabling signal and the state signal, to apply to the permanent magnet synchronous motor;
    a counter register coupled with the internal analog current processing circuit and the initial detecting vector generator, counting a rise time and a fall time of the motor current according to the enabling signal and the zero-current signal, respectively, so as to obtain the total conduction time of the motor current; and
    an initial angle detector coupled with the counter register, determining the initial rotor position according to an output of the counter register.

4. The apparatus of claim 3, wherein the counter register compares a presently obtained total conduction time with a total conduction time already stored in the counter register, and if the presently obtained total conduction time is shorter than the total conduction time already stored in the counter register, replaces the total conduction time already stored in the counter register with the presently obtained total conduction time.

5. The apparatus of claim 4, wherein the counter register, upon completion of counting the total conduction times corresponding to all the voltage vectors, informs the initial angle detector of one voltage vector corresponding to the total conduction time stored in the counter register.

6. The apparatus of claim 3, wherein the counter register stores the total conduction time of the motor current corresponding to each of the plurality of voltage vectors, and informs the initial angle detector of one voltage vector corresponding to a shortest one of the stored total conduction times.

7. The apparatus of claim 1, wherein the internal analog current processing circuit comprises:
    a double-ended amplifier circuit coupled with the current sensor, amplifying the sensing signal and adding thereto an offset voltage so as to generate an amplified signal;
    a first comparator coupled with the double-ended amplifier circuit, comparing the amplified signal with a first threshold value so as to generate the over-current signal; and
    a second comparator coupled with the double-ended amplifier circuit, comparing the amplified signal with a second threshold value so as to generate the zero-current signal.

8. The apparatus of claim 7, wherein the double-ended amplifier circuit comprises:
    a first resistor;
    a second resistor;
    an operational amplifier having a non-inverting input and an inverting input connected to two ends of the current sensor through the first and second resistors, respectively, and an output;
    a third resistor connected between the inverting input and the output of the operational amplifier; and
    a fourth resistor connected between a voltage source and the non-inverting input of the operational amplifier, wherein the voltage source provides the offset voltage.

9. The apparatus of claim 7, wherein the internal analog current processing circuit further comprises a digital-to-analog converter coupled to the first comparator, adjusting the first threshold value according to the voltage vector applied to the permanent magnet synchronous motor.

10. A method for use with a permanent magnet synchronous motor, comprising:
    sequentially applying a plurality of voltage vectors to the permanent magnet synchronous motor;
    detecting a total conduction time of a motor current in the permanent magnet synchronous motor corresponding to each of the plurality of voltage vectors, wherein the total conduction time includes a rise time and a fall time of the motor current; and
    determining an initial rotor position for the permanent magnet synchronous motor according to one voltage vector corresponding to a shortest total conduction time;
    wherein the step of detecting a total conduction time of a motor current comprises:
    sensing the motor current corresponding to a presently applied voltage vector, for generating a sensing signal;
    amplifying the sensing signal and adding thereto an offset voltage, for generating an amplified signal;
    comparing the amplified signal with a first threshold value, for generating an over-current signal;
    comparing the amplified signal with a second threshold value, for generating a zero-current signal;
    providing an enabling signal and a state signal according to the over-current signal and the zero-current signal, for determining the voltage vector applied to the permanent magnet synchronous motor; and
    counting the rise time and the fall time of the motor current according to the enabling signal and the zero-current signal, respectively, for extracting the total conduction time of the motor current corresponding to the presently applied voltage vector.

11. The method of claim 10, further comprising adjusting the first threshold value according to one voltage vector applied to the permanent magnet synchronous motor.

12. An apparatus for use with a permanent magnet synchronous motor, comprising:
- a current sensor coupled to the permanent magnet synchronous motor, sensing a motor current thereof to generate a sensing signal;
- an internal analog current processing circuit coupled with the current sensor, generating an over-current signal and a zero-current signal according to the sensing signal; and
- an internal digital initial angle detector, sequentially applying a plurality of voltage vectors to the permanent magnet synchronous motor, and according to the zero-current signal, counting a fall time of the motor current corresponding to each of the plurality of voltage vectors, so as to determine an initial rotor position for the permanent magnet synchronous motor.

13. The apparatus of claim 12, wherein the current sensor comprises a shunt resistor.

14. The apparatus of claim 12, wherein the internal digital initial angle detector comprises:
- an initial detecting vector generator coupled with the internal analog current processing circuit, providing an enabling signal and a state signal according to the over-current signal and the zero-current signal;
- a pulse width modulation generator coupled with the initial detecting vector generator, selecting one from the plurality of voltage vectors according to the enabling signal and the state signal, to apply to the permanent magnet synchronous motor;
- a counter register coupled with the internal analog current processing circuit, counting a fall time of the motor current according to the zero-current signal; and
- an initial angle detector coupled with the counter register, determining the initial rotor position according to an output of the counter register.

15. The apparatus of claim 14, wherein the counter register compares a presently obtained fall time with a fall time already stored in the counter register, and if the presently obtained fall time is shorter than the fall time already stored in the counter register, replaces the total conduction time already stored in the counter register with the presently obtained total conduction time.

16. The apparatus of claim 15, wherein the counter register, upon completion of counting the fall times corresponding to all the voltage vectors, informs the initial angle detector of one voltage vector corresponding to the fall time stored in the counter register.

17. The apparatus of claim 14, wherein the counter register stores the fall time of the motor current corresponding to each of the plurality of voltage vectors, and informs the initial angle detector of one voltage vector corresponding to a shortest fall time of the stored fall times.

18. The apparatus of claim 12, wherein the internal analog current processing circuit comprises:
- a double-ended amplifier circuit coupled with the current sensor, amplifying the sensing signal and adding thereto an offset voltage so as to generate an amplified signal;
- a first comparator coupled with the double-ended amplifier circuit, comparing the amplified signal with a first threshold value so as to generate the over-current signal; and
- a second comparator coupled with the double-ended amplifier circuit, comparing an output of the double-ended amplifier circuit with a second threshold value so as to generate the zero-current signal.

19. The apparatus of claim 18, wherein the double-ended amplifier circuit comprises:
- a first resistor;
- a second resistor;
- an operational amplifier having a non-inverting input and an inverting input connected to two ends of the current sensor through the first and second resistors, respectively, and an output;
- a third resistor connected between the inverting input and the output of the operational amplifier; and
- a fourth resistor connected between a voltage source and the non-inverting input of the operational amplifier, wherein the voltage source provides the offset voltage.

20. The apparatus of claim 18, the internal analog current processing circuit further comprises a digital-to-analog converter coupled to the first comparator, adjusting the first threshold value according to one voltage vector applied to the permanent magnet synchronous motor.

21. A method for use with a permanent magnet synchronous motor, comprising:
- sequentially applying a plurality of voltage vectors to the permanent magnet synchronous motor;
- detecting a fall time of a motor current in the permanent magnet synchronous motor corresponding to each of the plurality of voltage vectors; and
- determining an initial rotor position for the permanent magnet synchronous motor according to one voltage vector corresponding to a shortest fall time;
- wherein the step of detecting a fall time of a motor current in the permanent magnet synchronous motor comprises:
  - sensing the motor current corresponding to a presently applied voltage vector, for generating a sensing signal;
  - amplifying the sensing signal and adding thereto an offset voltage, for generating an amplified signal;
  - comparing the amplified signal with a first threshold value, for generating an over-current signal;
  - comparing the amplified signal with a second threshold value, for generating a zero-current signal;
  - providing an enabling signal and a state signal according to the over-current signal and the zero-current signal, for determining the voltage vector applied to the permanent magnet synchronous motor; and
  - counting the fall time of the motor current according to the zero-current signal.

22. The method of claim 21, further comprising adjusting the first threshold value according to one voltage vector applied to the permanent magnet synchronous motor.

* * * * *